United States Patent [19]
Hirose et al.

[11] Patent Number: 5,341,892
[45] Date of Patent: Aug. 30, 1994

[54] MOTOR AND PEDAL DRIVEN BICYCLE

[75] Inventors: Yasuo Hirose, Himeji; Yukifumi Yamaguchi, Kasai, both of Japan

[73] Assignee: Sanyo Electric Co., Ltd., Moriguchi, Japan

[21] Appl. No.: 28,825

[22] Filed: Mar. 10, 1993

[30] Foreign Application Priority Data

| Mar. 19, 1992 | [JP] | Japan | 63839 |
| Nov. 30, 1992 | [JP] | Japan | 320751 |

[51] Int. Cl.⁵ ............................................. B62K 11/10
[52] U.S. Cl. .................................. 180/220; 180/65.5; 280/288.4
[58] Field of Search .......... 180/220, 65.5, 65.1, 180/230; 280/230, 288.4

[56] References Cited

U.S. PATENT DOCUMENTS

| 3,773,131 | 11/1993 | Jaulmes . | |
| 4,280,581 | 7/1981 | Rudwick . | |
| 4,346,777 | 8/1982 | Restelli | 180/220 |
| 4,559,462 | 12/1985 | Hernandez-Badillo . | |
| 5,272,938 | 12/1993 | Hsu et al. | 180/65.5 |

FOREIGN PATENT DOCUMENTS

| 4000960 | 7/1991 | Fed. Rep. of Germany | 180/220 |
| 2082868 | 12/1971 | France . | |
| 2264676 | 10/1975 | France | 180/220 |
| 2436036 | 4/1980 | France . | |
| 53-10733 | 4/1978 | Japan . | |
| 253624 | 11/1948 | Switzerland | 180/220 |
| 424820 | 2/1935 | United Kingdom | 180/220 |

OTHER PUBLICATIONS

"An Electric Wheel Motor Unit Applied to Two Wheeled Vehicles", P. Campbell, pp. 57–62.

*Primary Examiner*—Margaret A. Focarino
*Assistant Examiner*—Kevin Hurley
*Attorney, Agent, or Firm*—Thomas R. Morrison

[57] ABSTRACT

A motor and pedal driven bicycle having a motor driving unit for providing driver power to a wheel in which the motor driving unit includes a disc-like casing having a space formed therein and dividable into two portions, a battery powered wheel driving motor, and a speed reducer coupled to the motor to reduce a revolution speed of the motor. The casing is composed of a fixed portion secured to a hub spindle of the wheel and a rotatable portion provided on a hub shell mounted on the hub spindle to be rotatable along with the hub shell. Either the motor or both the motor and the speed reducer are provided on the inside of the fixed portion of the casing.

17 Claims, 12 Drawing Sheets

MOTOR AND PEDAL DRIVEN BICYCLE

BACKGROUND OF THE INVENTION

1. Field of the Invention

The present invention relates to motor and pedal driven bicycles, and more particularly to a motor and pedal driven bicycle that can run with a wheel driving motor powered by a battery without pedaling (motor running mode), said bicycle also being capable of running by pedaling with the motor brought to a halt (pedal running mode), said bicycle also being capable of running by simultaneously pedaling and operating the motor used as an auxiliary power source (motor-assisted pedal running mode).

2. Description of the Prior Art

A conventionally known motor and pedal driven bicycle a motor driving unit essentially comprising a housing (casing) rotatably supported on a rear wheel axle (hub spindle) and is provided with spokes of the rear wheel, and a wheel driving motor mounted on the rear wheel axle in the housing in such a manner that the motor encloses the rear wheel axle (Japanese Published Examined Patent Application (Tokkyo Koho) No. SHO 53-10733/1978).

This kind of motor and pedal driven bicycle incorporates within the housing of the motor driving unit a speed reducer having a plurality of reducing gears in addition to a wheel driving motor. Further, the final step of the reducing gears in the speed reducer is engaged with the housing, thereby transmitting to the housing a revolution of the motor reduced with the speed reducer.

Such construction of the bicycle may cause a safety problem because it makes it impossible for users to check engagement of the speed reducer, namely engagement between the reducing gears therein and between the gears and the housing after the motor and the speed reducer has been incorporated in a predetermined location of the housing. In addition, such bicycle suffers from a drawback of inferior assemblage of the housing as a whole because it has been necessary to arrange the motor and the speed reducer in the housing to eliminate the need of checking the above engagement.

SUMMARY OF THE INVENTION

The present invention provides a motor and pedal driven bicycle providing a motor driving unit for giving driving power to a wheel in which said motor driving unit includes a disc-like casing having a space formed therein and dividable into two portions, a wheel driving motor powered by a battery and a speed reducer coupled to the motor to reduce a revolution speed of said motor. The casing is composed of a fixed portion secured to a hub spindle of the wheel and a rotatable portion provided on a hub shell mounted on said hub spindle to be rotatable along with said hub shell. Either the motor or both the motor and the speed reducer are provided on the inside of the fixed portion of the casing.

The above construction of the motor and pedal driven bicycle according to the present invention permits an easy check of engagement of the speed reducer with the motor and the speed reducer installed in the inside of the fixed casing portion when assembling the casing by incorporating only the wheel driving motor or both the wheel driving motor and the speed reducer in the casing of the motor driving unit. Such construction further permits a better assemblage of the housing.

BRIEF DESCRIPTION OF THE DRAWINGS

The present invention will be detailed with respect to the drawings in which.

DETAILED DESCRIPTION OF THE PREFERRED EMBODIMENTS

A motor driving unit according to the present invention may drive either a front wheel or a rear wheel. However, it is preferable to provide the motor driving unit on the rear wheel to drive the rear wheel. A casing of the motor driving unit requires a disc-like configuration dividable at least into two parts. The casing has a size that allows housing a predetermined wheel driving motor and a speed reducer in a fixed portion thereof. As a material to be used for forming the casing, aluminum alloy or stainless steel is appropriately selected and employed. Among them, aluminum alloy is preferable owing to the light weight and the excellent heat dissipation.

The wheel driving motor may be of any type as long as it is powered by a battery. The battery can be of any kind such as, for example, a rechargeable dry battery, a rechargeable storage battery, a non-rechargeable dry battery, a solar battery or the like. The battery can be of one kind or of a combination of two or more kinds, but it must generate power sufficient to give a desired driving force to the motor. A battery unit comprising these batteries is not necessarily provided at any specific part of the bicycle, but can be provided appropriately at any place, for example on a luggage carrier over the rear wheel, in a space surrounded by a top tube, a down tube and a seat tube of a frame, and in a luggage cage over the front wheel.

When using a solar battery as a single entity or a solar battery combined with a different kind of a battery, a solar ray absorbing panel for supplying energy to the main body of the battery can be provided at an appropriate place, for example, on the luggage carrier above the rear wheel, or an appropriate place above the front wheel.

The speed reducer currently used in the motor driving unit includes a combination of a plurality of reducing pulleys and pulley belts, and a combination of a plurality of reducing gears.

On a handle bar, a handle stem or the top tube or the seat tube of the frame is provided a unit for shifting a running mode such as a motor running mode for driving the bicycle by operating a motor driving unit, a pedal running mode for driving the same by pedaling, and the motor-assisted pedal running mode for driving the same by pedaling with the motor driven as an auxiliary power.

The motor and pedal driven bicycle according to the present invention comprises a motor driving unit, having a disc-like casing dividable into two parts, one part of said casing constituting a fixed portion whereas the other part thereof constituting a rotatable portion. The fixed portion incorporates either a wheel driving motor or both said wheel driving motor and a speed reducer. Consequently, after providing either the motor or both the motor and the speed reducer in the fixed portion of the casing, the rotatable portion can be installed. This means that such construction permits an easy check of the engagement of the speed reducer with the motor and the speed reducer provided therein and further permits better assemblage of the housing.

Preferably, in the motor and pedal driven bicycle according to the present invention, the final step of the reducing members in the speed reducer and the rotatable portion of the casing are integrated to form one entity. Such construction permits a much easier check of the engagement of the speed reducer in the process of assembling the casing and further permits much better assemblage of the housing.

Further, in the motor and pedal driven bicycle according to the invention, the rotatable portion of the casing comprises two parts, one part constituting a plate portion opposite to the fixed portion of the casing while the other portion constituting a drum portion provided on the periphery of the plate portion. Such construction facilitates the manufacture of the rotatable portion of the casing and further reinforces the periphery thereof.

In the motor and pedal driven bicycle according to the present invention, the motor and the speed reducer may be provided at a location lower than the hub spindle of the wheel. In such case, the center of gravity of the motor and pedal driven bicycle is set at a position lower than a type of bicycle having the motor and the speed reducer at a position higher than the hub spindle of the wheel, thereby insuring increase stability during operation.

Additionally, part of the fixed portion of the casing simultaneously serves as a motor cover for the motor. In such case, the motor cover is not required, thereby allowing a reduction in the entire size of the casing and an efficient cooling of the motor.

Further, in the motor and pedal driven bicycle according to the present invention, a control unit comprising a control substrate and a control circuit is disposed within the fixed portion of the casing. Such construction permits saving space required for providing the control unit and further protects the control unit against damage caused by water such as rain and the like. Besides, when components inevitably to be heated are provided within the fixed portion of the casing in such a manner that the components come close to or almost contact the internal surface of the fixed portion, heat can be efficiently dissipated.

EMBODIMENTS

The present invention will be detailed with respect to two embodiments shogun in the drawings, but it is not limited to them.

EMBODIMENT 1

Figure 1:
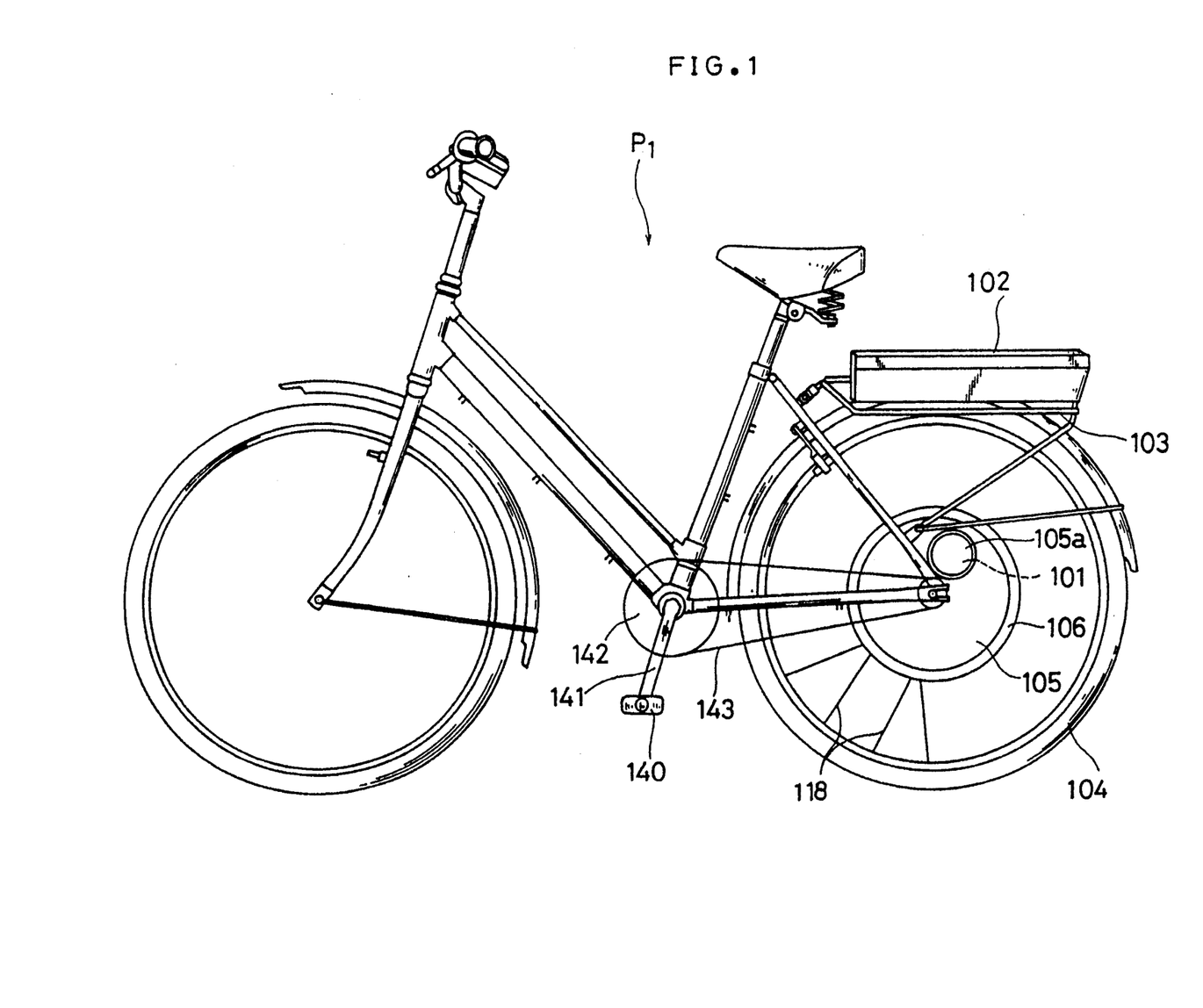
FIG. 1 is a view illustrating an entire constitution of a first embodiment of a motor and pedal driven bicycle according to the present invention.

Referring to FIG. 1, a motor and pedal driven bicycle $P_1$ is provided with a motor driving unit transmitting a driving force to a wheel by a motor. The motor driving unit provides a rear wheel driving motor 101. The motor and pedal driven bicycle $P_1$ according to the present invention has a battery portion 102 powering the motor 101 arranged on a carrier 103 and a disc-like casing 105, 106 formed of aluminum alloy and arranged on a rear wheel 104. The battery portion 102 essentially comprises a battery case, 20 NR-D type rechargeable dry batteries with 24 V (1.2 V×20 batteries).

Referring to FIGS. 2 through 6, the casing 105, 106 can be divided into two parts covering the longitudinal intermediate portion of a hub spindle 107 on the rear wheel 104. One part is fixed on the hub spindle 107 to constitute a fixed portion 105 of the casing other part is provided on a hub shell 124 covering the hub spindle 107, and on spokes 118, to constitute a rotatable portion 106 of the casing which can rotate along with the hub shell 124.

Figure 2:
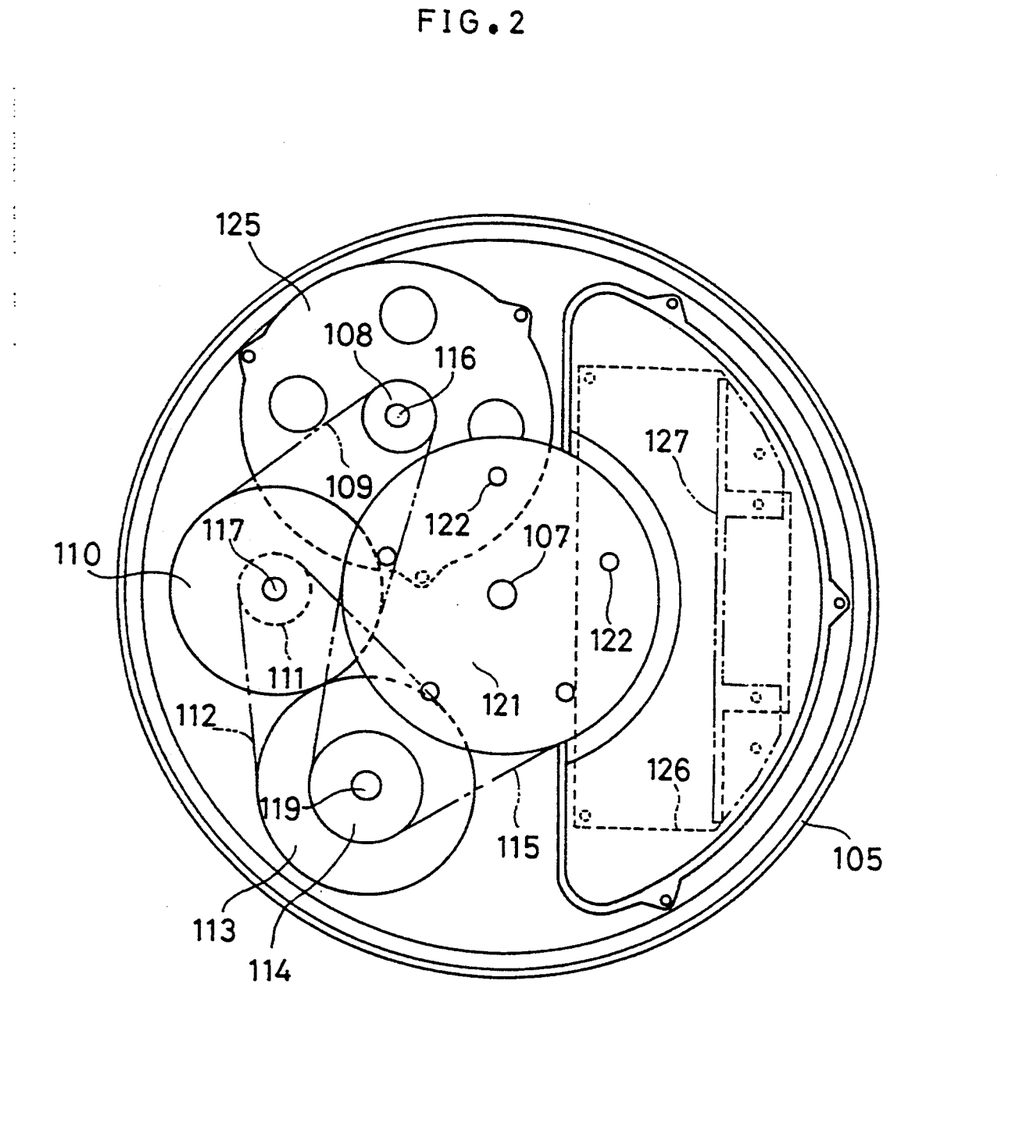
FIG. 2 is an enlarged view illustrating an inside of a housing of the motor and pedal driven bicycle as seen from the front side thereof.
Figure 3:
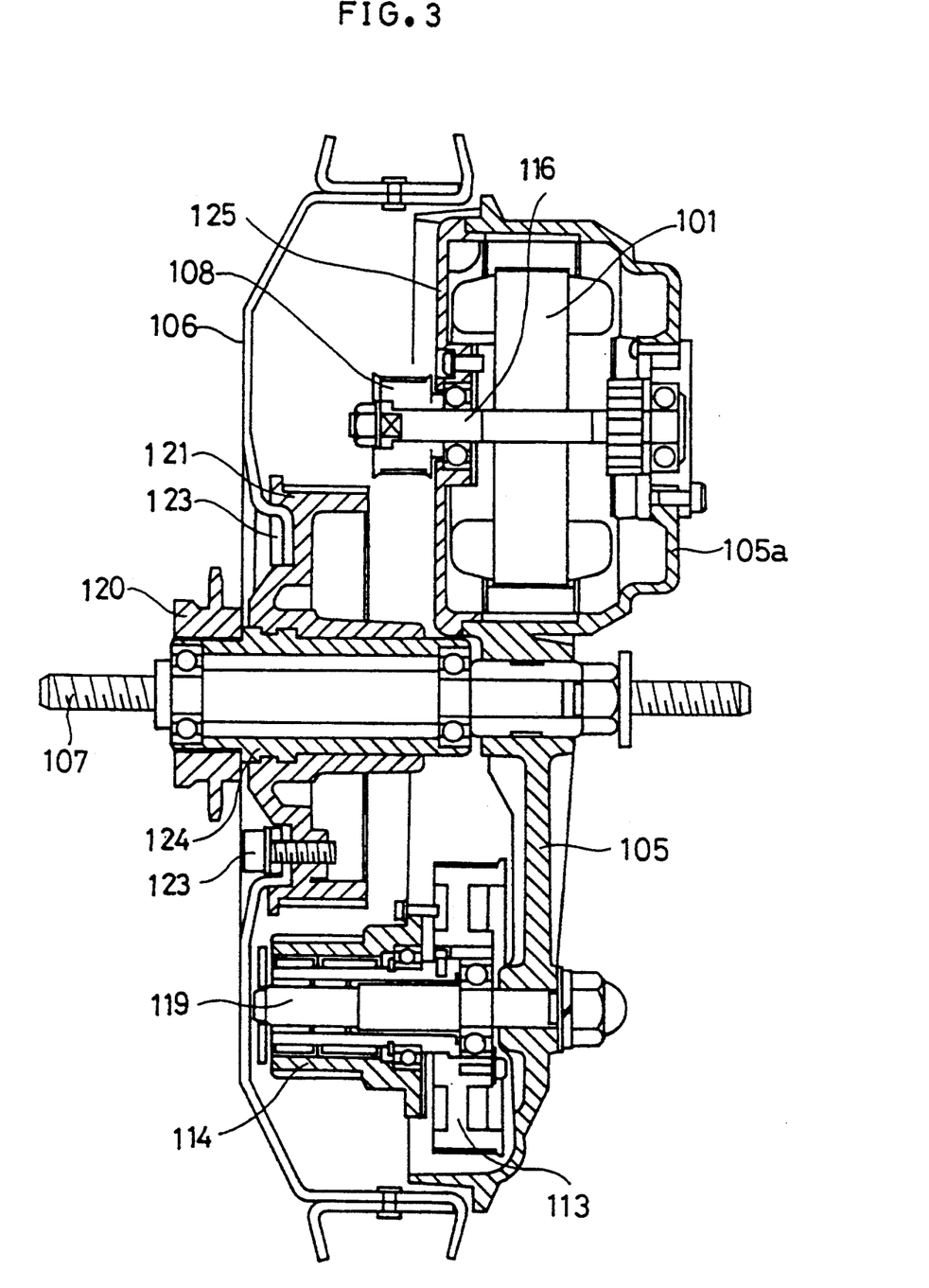
FIG. 3 is an overall sectional view of the housing of the motor and pedal driven bicycle.
Figure 4:
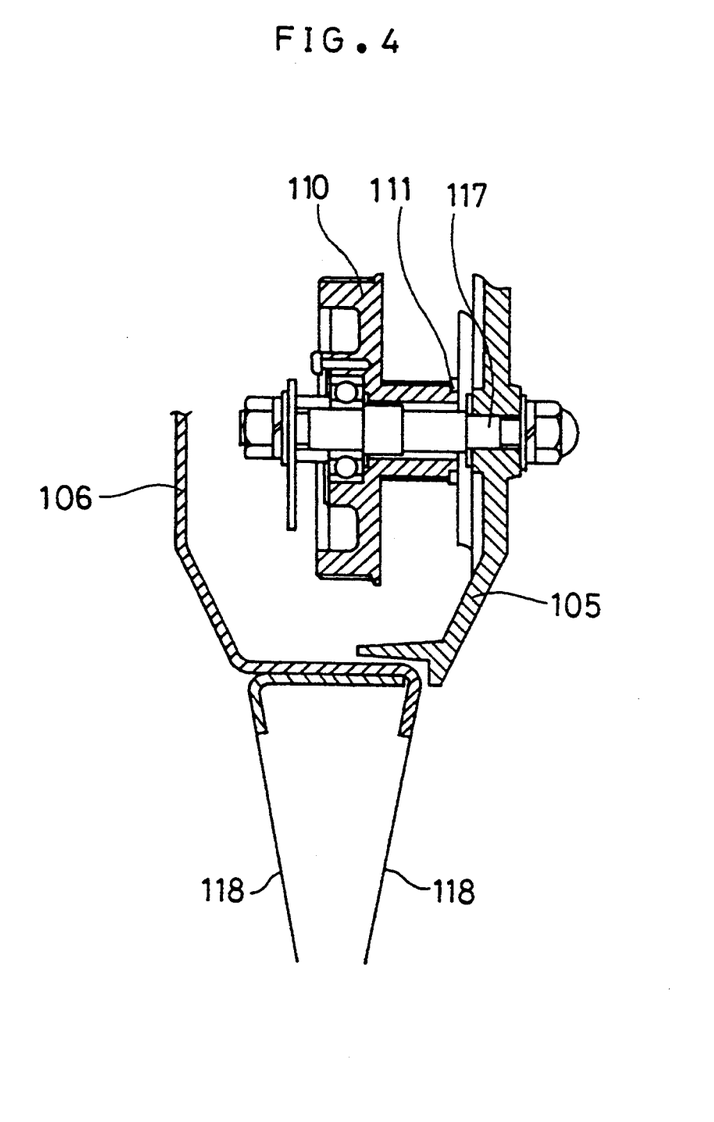
FIG. 4 is a partial sectional view of the housing.

Inside of the casing 105, 106, the rear wheel driving motor 101 powered by the dry batteries and a speed reducer for reducing a revolution speed of the motor 101, are provided.

In other words, the motor 101 is mounted on a motor base 125 provided above the hub spindle 107 on the internal surface of the fixed portion 105 of the casing. The motor 101 is housed between the motor base 125 and a motor cover 105a outwardly projecting from the fixed portion 105 of the casing, said motor cover 105a being located opposite to the motor base 125.

The speed reducer comprises a motor pulley 108, a first belt 109 fox power transmission, a first pulley 110 for speed reduction, a second pulley 111 for speed reduction, a second belt 112 for power transmission, a third pulley 113 for speed reduction, a fourth pulley 114 for speed reduction, a third belt 115 for power transmission and a fifth pulley 121 fox speed reduction serving as the final step pulley for speed reduction. The fifth pulley 121 for speed reduction is integrated with the hub shell 124 to form one entity in such a manner that the pulley surrounds most of the hub shell 124. The speed reducer transmits the revolution of the motor 101 to the above portions in the above order to reduce the revolution speed thereof to a predetermined one.

Reference numeral 116 designates a motor spindle of the motor 101, 117 a pulley spindle serving as a common spindle for the first pulley 110 for speed reduction and the second pulley 111 for speed reduction, 119 a pulley spindle serving as a common spindle for the third pulley 113 for speed reduction and the fourth pulley 114 for speed reduction, and 120 a chain ring with teeth (sprocket) for transmitting a driving force generated by a pedal 140 to the rotatable portion 106 of the casing through a crank 141, a chain sprocket 142, and a chain 143.

The engagement condition of the speed reducer is checked for the presence of any trouble therein from a tension of each belt 109, 112 and 115, a revolution noise of each spindle 107, 116, 117 and 119 with the motor 101 and the speed reducer installed on the internal surface of the fixed portion 105 of the casing as mentioned above. When the engagement condition is unfavorable, an appropriate measure must be taken to improve the engagement condition by, for example, adjusting the tensile strength of each belt 109, 112 and 115.

Subsequently, the rotatable portion 106 of the casing is mounted. In other words, the fifth pulley 121 for speed reduction has five bolt holes 122 and the rotatable portion 106 of the casing has five holes 128 corresponding to the former five bolt holes 122 provided on the fifth pulley 121 for speed reduction. After checking the engagement condition, the rotatable portion 106 of the casing is mated with the fifth pulley 121 for speed reduction allowing insertion of screw bolts 123 into the holes 128 and the bolt holes 122, thereby completing the fabrication of the casing portions 105, 106.

As shown in FIG. 2, on the internal surface of the rotatable portion 105 of the casing a control unit 126 comprising a control substrate and a control circuit component is provided in such a manner that the control unit 126 comes close to the internal surface thereof. In addition, to further dissipate heat from the heated control unit 126, a heat dissipating plate 127 is also provided thereon.

Figure 5:
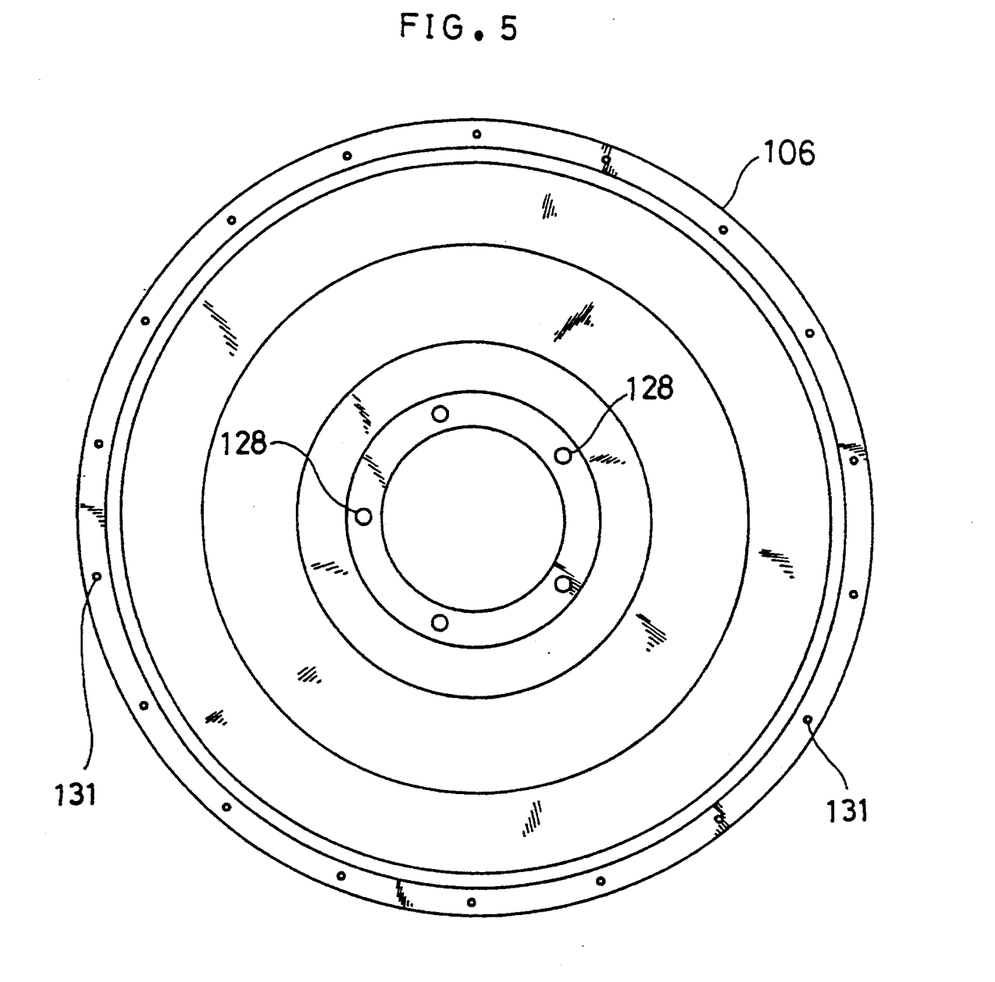
FIG. 5 is an elevational view of a rotatable portion of a casing in the housing.
Figure 6:
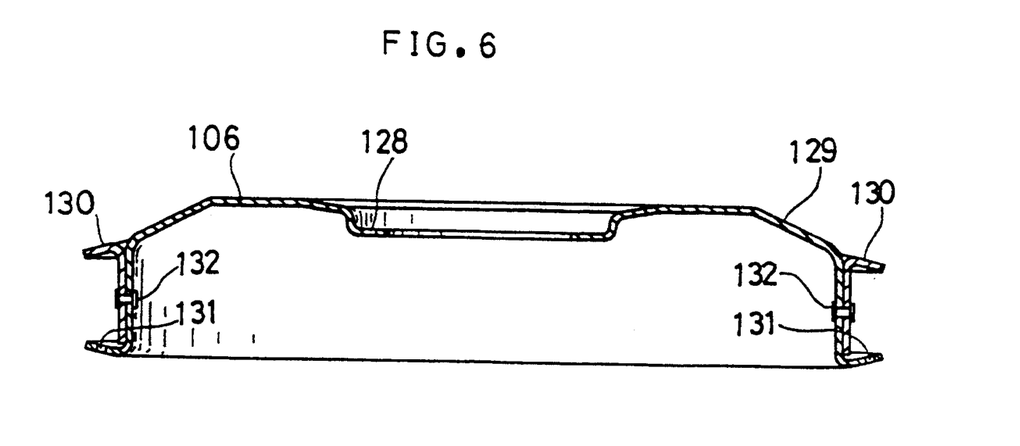
FIG. 6 is a sectional view of the rotatable portion of the casing in the housing.

Subsequently, construction of the rotatable portion 106 of the casing will be detailed with respect to FIG. 5 and FIG. 6. The rotatable casing 106 consists of two parts. One part constitutes a plate portion 129 opposite to the fixed portion 105 of the casing whereas the other part constitutes a drum portion 130 provided at a periphery of the plate portion 129.

The plate portion 129 is of a deep round plate-like configuration which consists of a main body located opposite to the fixed portion 105 of the casing and a surrounding wall portion connected to the main body. On the periphery of the surrounding wall portion of the plate portion 129 are provided 18 spoke holes 131 for providing spokes 118 equally spaced to each other. On the surrounding wall portion of the plate portion 129 the drum portion 130 having a cross section with an approximately L configuration is joined with rivets 132 in such a manner that the drum portion 130 surrounds the surrounding wall. On the periphery of the drum portion 130 are provided 18 spoke holes 131 equally spaced to each other.

Thus, the rotatable portion 106 of the casing, which consists of two parts, can be manufactured in a simple process by adopting a press working whereas the fixed portion 105, which constitutes an integral entity, must be machined in a complicated process. In addition, the periphery of the rotatable portion 106 of the casing has a double structure consisting of the plate portion 129 and the drum portion 130, which provides a reinforced strength thereto.

This motor and pedal driven bicycle $P_1$ is provided with the rear wheel driving motor 101 and the speed reducer for reducing the revolution speed of the motor 101 inside of the casing. The fifth pulley 21 for speed reduction constituting the final step of the speed reducing members incorporated in the speed reducer and the rotatable portion 106 of the casing are integrally screwed together. Therefore, the motor and pedal driven bicycle $P_1$ permits an easy check of the engagement condition of the speed reducer for the presence of any trouble therein from the tensile strength of each belt 109, 112, and 115, and the revolution noise of each spindle 107, 116, 117 and 119.

In addition, the motor 101 is mounted on the motor base 125 provided on the internal surface of the fixed portion 105 of the casing. The motor 101 is housed between the motor base 125 and the motor cover portion 105a outwardly projecting from the fixed portion 105 of the casing, said motor cover portion 105a being located opposite to the motor base 125. Thus, such construction eliminates the need for providing a cover for the motor 101, thereby reducing the size of the casing 105, 106 compared with a motor having a separate motor cover.

EMBODIMENT 2

Figure 11:
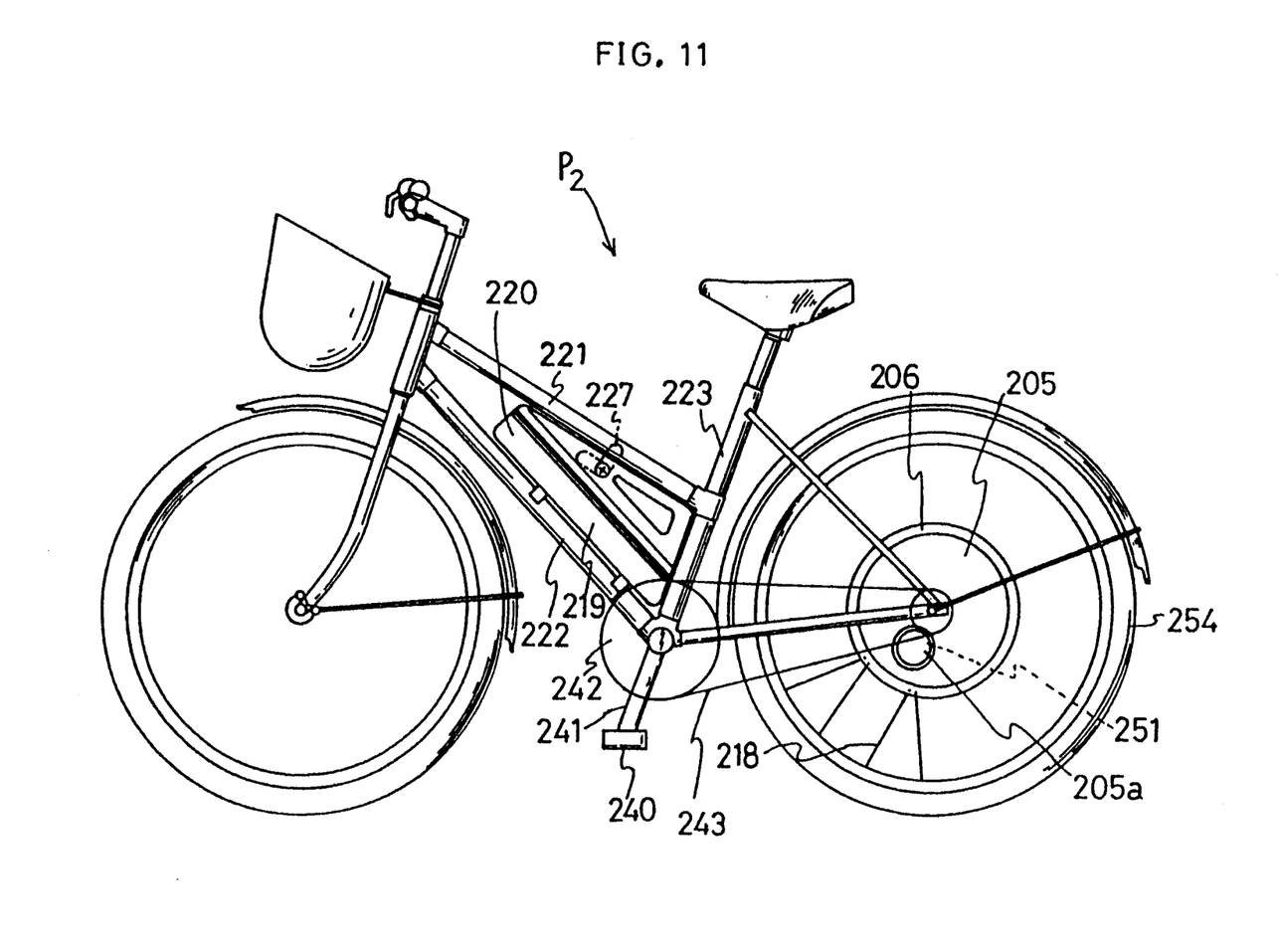
FIG. 11 is a view illustrating an entire constitution of the motor and pedal driven bicycle as seen from the front side thereof.

Referring to FIG. 11, a motor and pedal driven bicycle $P_2$ comprises a battery portion 220 powering a rear wheel driving motor 251, said battery portion 220 being arranged in a space surrounded by a top tube 221, a down tube 222 and a seat tube 223, and a disc-like casing 205, 206 formed of aluminum alloy and arranged on a rear wheel 254. The battery portion 220 essentially comprises a battery case 219, 20 NR-D type rechargeable dry batteries with 24 V (1.2×20 batteries) and a lock 226, 227 provided on the battery case 219.

Figure 7:
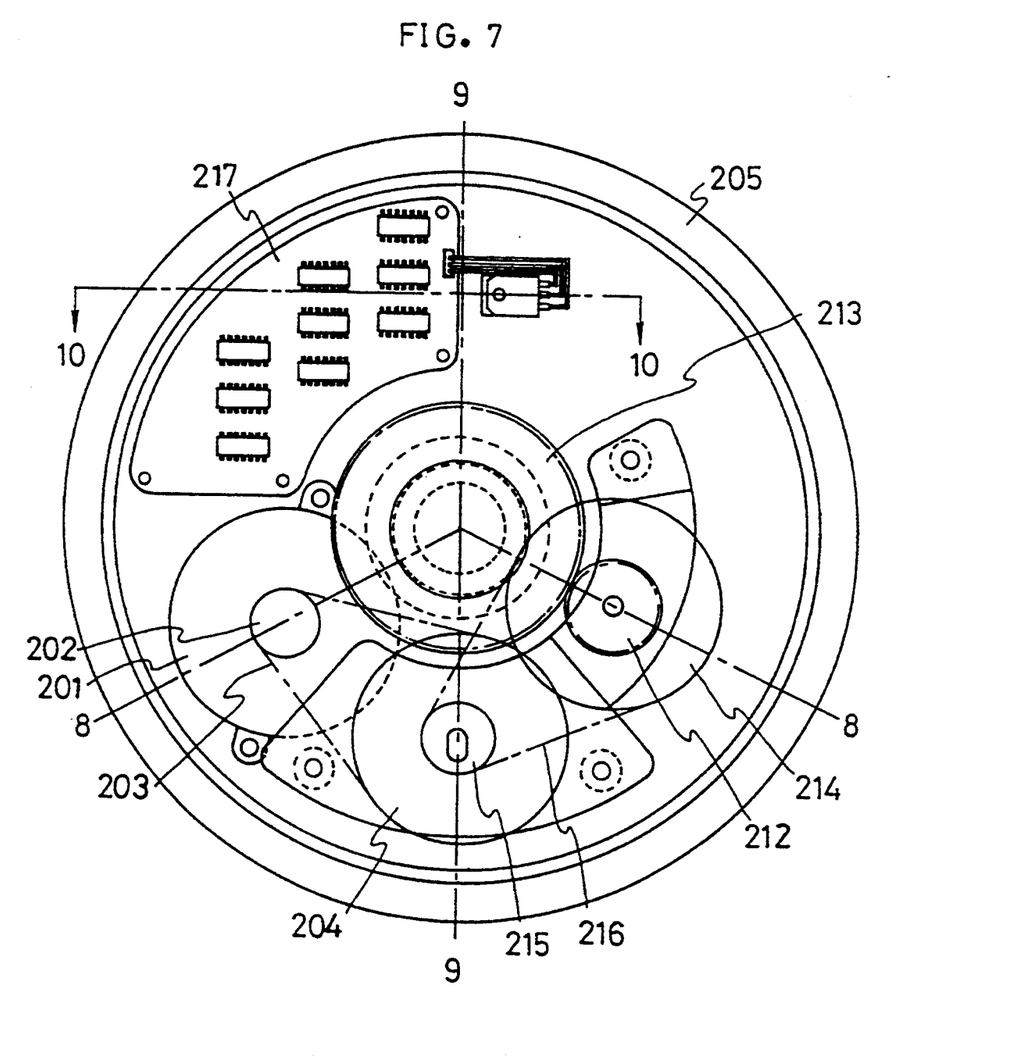
FIG. 7 is an enlarged view illustrating an inside of a housing in a second embodiment according to the present invention as seen from the front side thereof.
Figure 8:
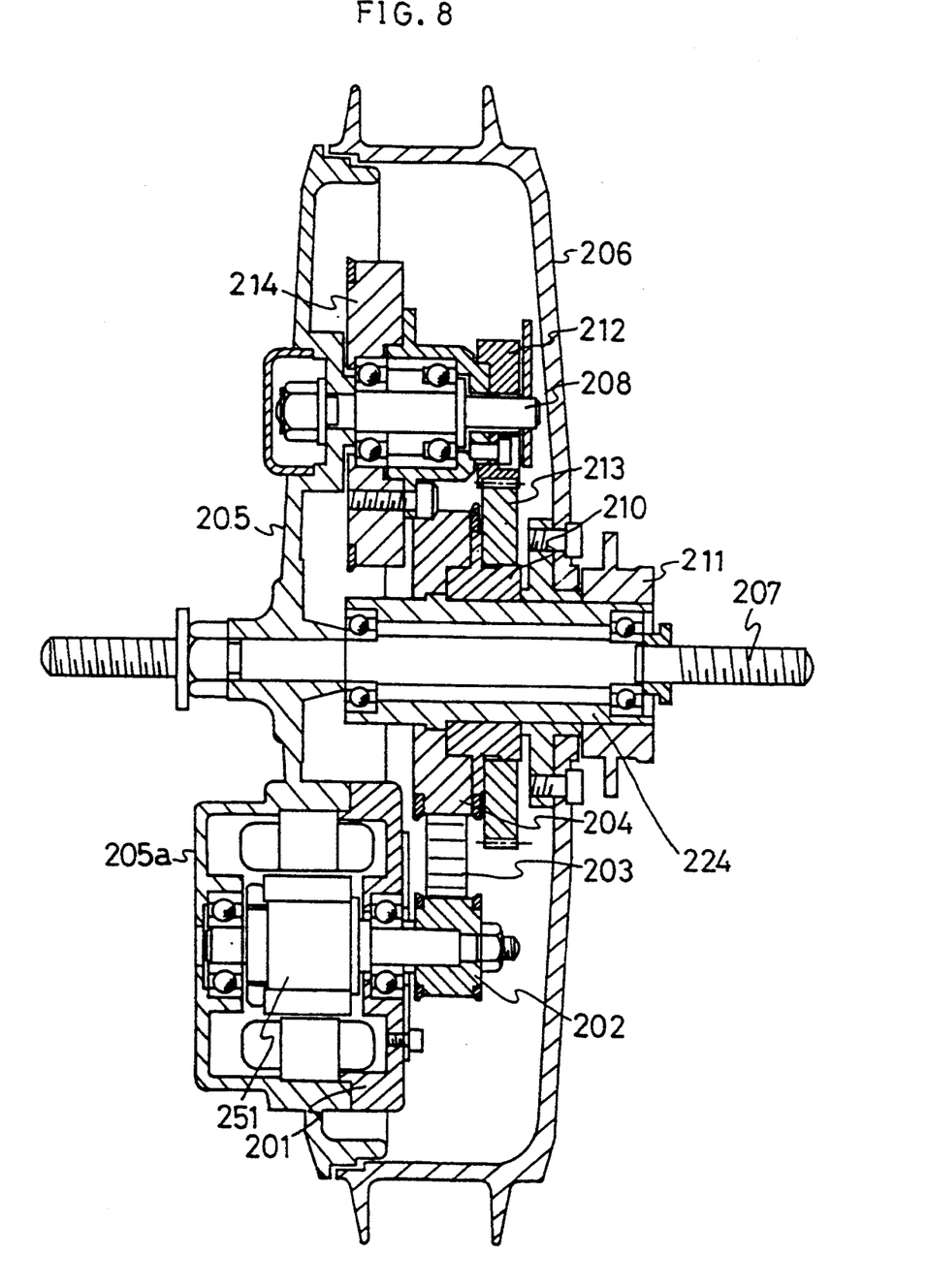
FIG. 8 is a sectional view taken along line 8—8 of FIG. 7.
Figure 9:
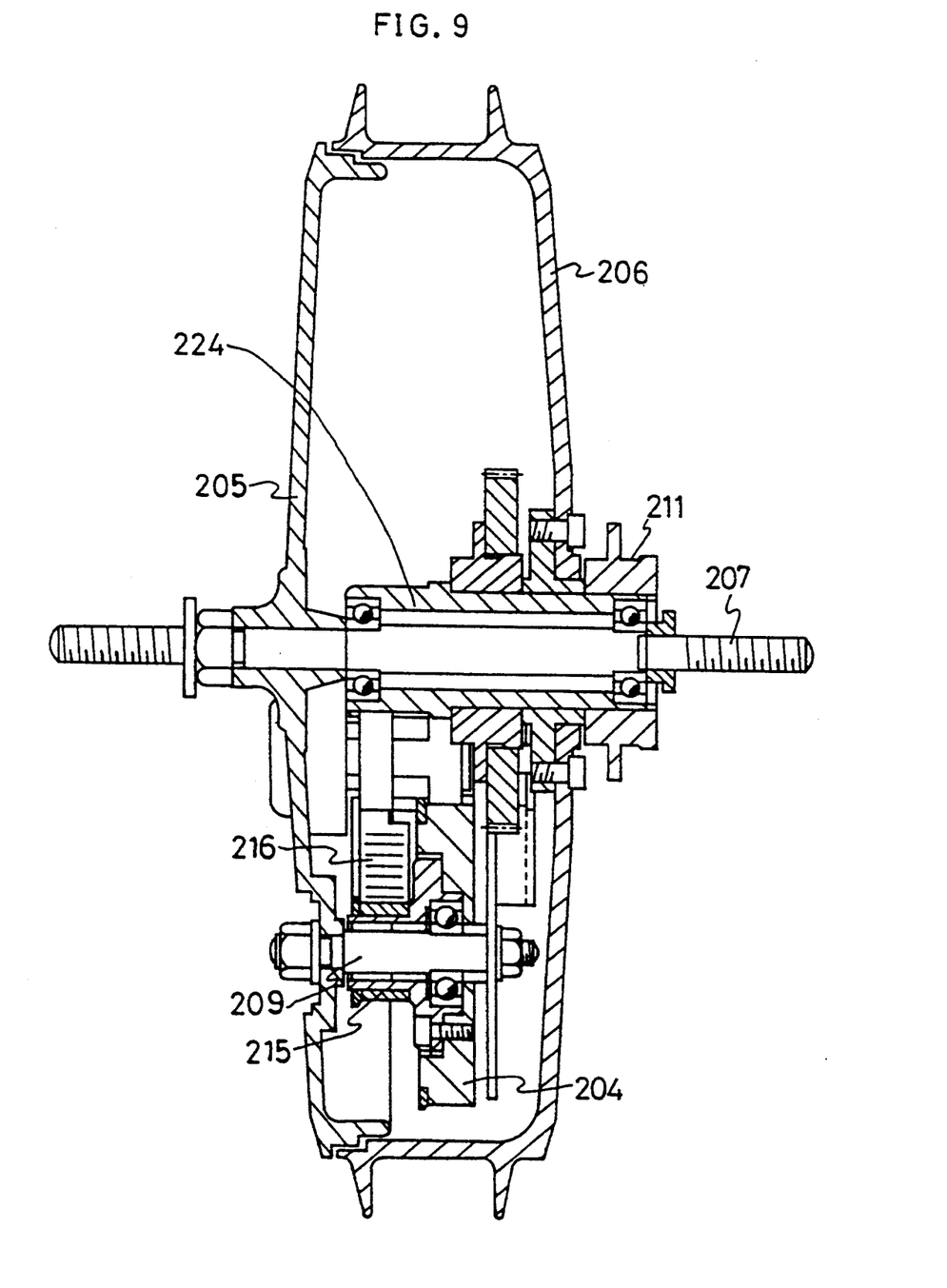
FIG. 9 is a sectional view taken along line 9—9 of FIG. 7.

Referring to FIGS. 7 through 9, the casing 205, 206 can be divided into two parts covering the longitudinal intermediate portion of a hub spindle 207 on a rear wheel 254. One part is fixed on the hub spindle 207 to constitute a fixed portion 205 of the casing whereas the other part is provided on a hub shell 224 covering the hub spindle 207 and on spokes 218 to constitute a rotatable portion 206 of the casing which can rotate along with the hub shell 224.

On the internal surface of the casing 205, 206 the rear wheel driving motor 251 powered by the dry batteries and a speed reducer for reducing a revolution speed of the motor 251 are provided at a location lower than the hub spindle 207.

In other words, the motor 251 is mounted on a motor base 201 provided below the hub spindle 207 on the internal surface of the fixed portion 205 of the casing. The motor 251 is housed between the motor base 201 and a motor cover portion 205a outwardly projecting from the fixed portion 205 of the casing, said motor cover portion 205a being located opposite to the motor base 201.

The speed reducer comprises a motor pulley 202, a first belt 203 for power transmission, a first pulley 204 for speed reduction, a second pulley 215 for speed reduction, a second belt 216 for power transmission, a third pulley 214 for speed reduction, a small gear 212 and a large gear 213. The revolution of the motor 251 is transmitted to the above parts in the above order to be reduced to about 1/32. Here the large gear 213 is secured on the rotatable portion 206 of the casing to engage with the small gear 212 in the fixed casing 205 upon assembling the rotatable portion 206 of the casing with the fixed portion 205 of the casing.

Referring to FIGS. 8 and 9, reference numerals 208 and 209 designate respectively an intermediate spindle A and an intermediate spindle B provided on the fixed portion 205 of the casing. Reference numeral 211 designates a chain ring with teeth for transmitting a driving power generated by the revolution of a pedal 240 to a crank 241, a chain sprocket 242, a chain 243 and the hub shell 224 at any desired occasion (when the pedal running or the motor-assisted pedal running mode is desired).

The revolution of the motor 251 transmitted to the large gear 213 is transmitted to the hub shell 224 by a shell type roller clutch (one-way clutch) 210 to the hub shell 224. Subsequently, the revolution of the hub shell 224 causes the rotatable portion 206 of the casing to rotate, thereby rotating the rear wheel 254.

Figure 10:
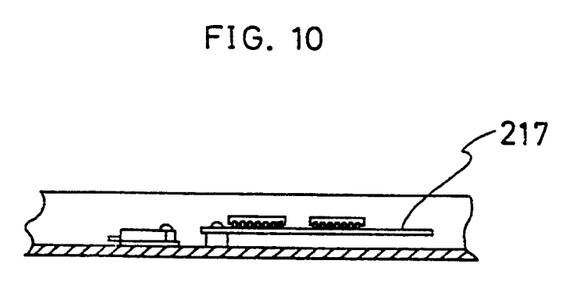
FIG. 10 is a sectional view taken along line 10—10 of FIG. 7.

At a location higher than the hub spindle 207 on the internal surface of the fixed portion 205 of the casing, a control unit 217 comprising a control substrate and a control circuit component is provided in such manner that the control unit 217 comes close to the internal surface thereof as shown in FIGS. 7 and 10. In other words, components inevitably to be heated for use in a motor driving field effect transistor (FET) and the like in the control unit 217 are provided on the internal surface of the casing in such a manner that the FET in the control unit 217 comes close to the internal surface thereof. Such construction permits saving a space for installation compared with the type provided with the control unit 217 on a predetermined location of the casing. In addition, the control unit 217 is protected against damages caused by water, such as rain and the like. The fixed portion 205 and the rotatable portion 206 are formed of aluminum alloy. The components inevitably to be heated in the control unit 217 are provided in such a manner that the components inevitably to be heated come close to the fixed portion 205 of the casing to effectively dissipate heat from the heated control unit 217.

Figure 12:
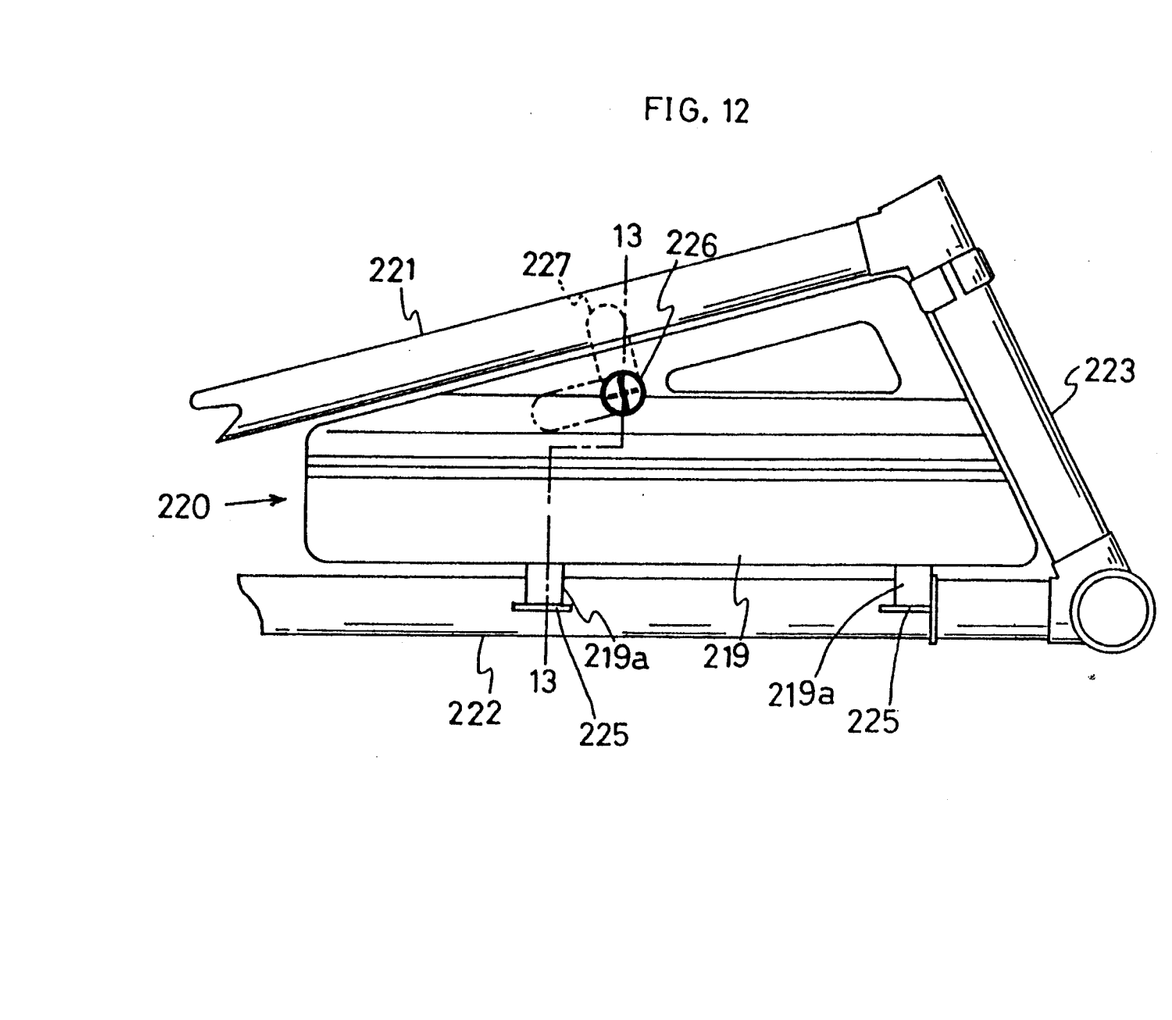
FIG. 12 is an enlarged view illustrating a construction of a battery portion of the motor and pedal driven bicycle as seen from the front side thereof.
Figure 13:
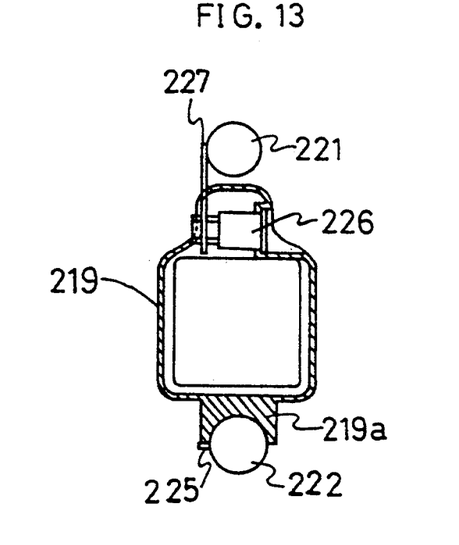
FIG. 13 is a sectional view taken along line 13—13 of FIG. 12.

Subsequently, a construction of the battery portion 220 will be detailed by way of FIGS. 11 through 13. The battery case 219 has an approximately triangle-shaped front configuration having on the longest side of the triangle two hook portions 219a, 219a for mounting the battery case 219 on the down tube 222. In mounting the battery case 219, the hook portions 219a, 219a are turned on the down tube 222 serving as a shaft to force the hook portions 219a, 219a to come into contact with a stopper 225, 225 provided on the down tube 222.

In the next process, into a key operation unit 226 in the lock 226, 227 provided on the top tube 221 of the battery case 219, a power source key for turning on the motor 251 to rotate a rotating plate portion 227 (provided on one side of the stopper 225) is inserted to rotate the rotating plate portion 227. Thus, the rotating plate portion 227 is forced to project upward to be engaged with the top tube 221, which makes it impossible to remove the battery case 219.

Such motor and pedal driven bicycle P₂ is provided with the rear wheel driving motor 251 and the speed reducer for reducing the revolution speed of the motor 251 on the internal surface of the fixed portion 205 of the casing both at the location lower than the hub spindle 207 of the rear wheel 254. Thus, the center of gravity of the motor and pedal driven bicycle P₂ is located at a position lower than that of a type of bicycle having a motor and a speed reducer provided at a location higher than a hub spindle, thereby providing a high stability in running modes.

Further, the motor 251 is mounted on the motor base 201 below the hub spindle 207 on the internal surface of the fixed portion 205 of the casing and is housed between the motor base 201 and the motor cover portion 205a outwardly projecting from the fixed portion 205, the motor cover portion 205a being located opposite to the motor base 201. Thus, such construction eliminates the need for providing a cover for the motor 251, thereby reducing the size of the casing 205, 206 compared with a motor having a separate motor cover.

Still further, in such motor and pedal driven bicycle P₂, the battery portion 220 having a considerable weight is arranged in the space surrounded by the top tube 221, the down tube 222 and the seat tube 223 as mentioned above. Thus, in addition to the location of the motor 251 and the speed reducer 207 provided lower than the hub spindle 207, the center of gravity is located at a position lower than that of a type of bicycle having a motor and a speed reducer provided at a location higher than the hub spindle, thereby providing a high stability in running modes. In addition, the battery case 219 cannot be removed without unlocking the lock 226, 227, thereby making it possible to prevent the theft of the battery portion 220 with simple construction.

What is claimed is:

1. A motor and pedal driven bicycle, comprising:
   a motor driving unit for imparting driving power to a wheel;
   said driving unit including a disc-like casing having a space formed therein and dividable into two portions;
   said driving unit further including a battery powered wheel driving motor;
   a speed reducer coupled to said battery powered wheel driving motor, said speed reducer including means for reducing a revolution speed of said battery powered wheel driving motor;
   said disc-like casing including a fixed portion and a rotatable portion;
   said fixed portion being secured to a hub spindle of said wheel;
   said rotatable portion being disposed on a hub shell, said hub shell being rotatably mounted on said hub spindle, whereby said rotatable portion is rotatable about said hub spindle along with said hub shell;
   at least one of said battery powered wheel driving motor and said speed reducer is provided on an inside of said fixed portion of said disc-like casing; and
   said battery powered wheel driving motor and at least a part of said speed reducer are both provided at a location lower than said hub spindle.

2. The motor and pedal driven bicycle according to claim 1, wherein:
   said speed reducer includes a plurality of reducing members;
   said plurality of reducing members comprising a first step through a final step; and
   said final step being integrated with said rotatable portion of said disc-like casing.

3. The motor and pedal driven bicycle according to claim 1, wherein:
   said speed reducer includes a plurality of pulleys;
   said plurality of pulleys comprising a first step through a final step; and
   said final step being connected to and made an integral part of said rotatable portion of said disc-like casing by a screw member.

4. The motor and pedal driven bicycle according to claim 1, wherein:
   said rotatable portion of said disc-like casing includes a plate portion and a drum portion;
   said plate portion disposed opposite to said fixed portion; and said drum portion disposed on the periphery of said plate portion.

5. The motor and pedal driven bicycle according to claim 1, wherein:
a part of said fixed portion of said disc-like casing forms a motor cover for said battery powered wheel driving motor.

6. A motor and pedal driven bicycle, comprising:
a motor driving unit for imparting driving power to a wheel;
said driving unit including a disc-like casing having a space formed therein and dividable into two portions;
said driving unit further including a battery powered wheel driving motor;
a speed reducer coupled to said battery powered wheel driving motor, said speed reducer including means for reducing a revolution speed of said battery powered wheel driving motor;
said disc-like casing including a fixed portion and a rotatable portion;
said fixed portion being secured to a hub spindle of said wheel;
said rotatable portion being disposed on a hub shell, said hub shell being rotatably mounted on said hub spindle, whereby said rotatable portion is rotatable about said hub spindle along with said hub shell;
at least one of said battery powered wheel driving motor and said speed reducer is provided on an inside of said fixed portion of said disc-like casing; and
a pedal rotatably supported on a first end of a crank;
a chain sprocket coaxially provided on a crank spindle at a second end of said crank; and
a chain ring with teeth mounted on the hub shell and coupled to said chain sprocket through a chin for transmitting a driving force generated by a revolution of said pedal to said hub shell through said crank, said chain sprocket and said chain when desired.

7. A motor and pedal driven bicycle, comprising:
a motor driving unit for imparting driving power to a wheel;
said driving unit including a disc-like casing having a space formed therein and dividable into two portions;
said driving unit further including a battery powered wheel driving motor;
a speed reducer coupled to said battery powered wheel driving motor, said speed reducer including means for reducing a revolution speed of said battery powered wheel driving motor;
said disc-like casing including a fixed portion and a rotatable portion;
said fixed portion being secured to a hub spindle of said wheel;
said rotatable portion being disposed on a hub shell, said hub shell being rotatably mounted on said hub spindle, whereby said rotatable portion is rotatable about said hub spindle along with said hub shell;
at least one of said battery powered wheel driving motor and said speed reducer is provided on an inside of said fixed portion of said disc-like casing; and
a control unit including a control substrate and at least one control circuit component being provided on said fixed portion of said disc-like casing.

8. The motor and pedal driven bicycle according to claim 7 wherein any individual one of said at least one circuit component which is subject to heating in said control unit is provided on an internal surface of said fixed portion of said disc-like casing in such a manner that said individual one of said at least one circuit component which is subject to heating comes close to said internal surface.

9. A motor and pedal driven bicycle, comprising:
a motor driving unit for imparting driving power to a wheel;
said driving unit including a disc-like casing having a space formed therein and dividable into a fixed portion and a rotatable portion;
said driving unit further including a battery powered wheel driving motor;
a speed reducer coupled to said battery powered wheel driving motor, said speed reducer including means for reducing a revolution speed of said battery powered wheel driving motor;
said fixed portion being secured to a hub spindle of said wheel;
at least one of said battery powered wheel driving motor and said speed reducer is provided on an inside of said fixed portion of said disc-like casing;
a rotational element of said speed reducer is coaxially disposed on said hub shell, said hub shell being rotatably mounted on said hub spindle; and
said rotatable portion being removably fastened to said hub shell whereby said rotatable portion is rotatable about said hub spindle along with said hub shell and removal of said rotatable portion allows access to said motor and said reducer without requiring partial disassembly thereof.

10. The motor and pedal driven bicycle according to claim 9, wherein:
said speed reducer includes a plurality of reducing members;
said plurality of reducing members comprising a first step through a final step; and
said final step being integrated with said rotatable portion of said disc-like casing.

11. The motor and pedal driven bicycle according to claim 9, wherein:
said speed reducer includes a plurality of pulleys;
said plurality of pulleys comprising a first step through a final step; and
said final step being connected to and made an integral part of said rotatable portion of said disc-like casing by a screw member.

12. The motor and pedal driven bicycle according to claim 9, wherein:
said rotatable portion of said disc-like casing includes a plate portion and a drum portion;
said plate portion disposed opposite to said fixed portion; and
said drum portion disposed on the periphery of said plate portion.

13. The motor and pedal driven bicycle according to claim 9, wherein:
said battery powered wheel driving motor and at least a part of said speed reducer are both provided at a location lower than said hub spindle.

14. The motor and pedal driven bicycle according to claim 9, wherein:
a part of said fixed portion of said disc-like casing forms a motor cover for said battery powered wheel driving motor.

15. The motor and pedal driven bicycle according to claim 9, wherein:

a control unit including a control substrate and at least one control circuit component is provided on said fixed portion of said disc-like casing.

16. The motor and pedal driven bicycle according to claim 15, wherein:

any individual one of said at least one circuit component which is subject to heating in said control unit is provided on an internal surface of said fixed portion of said disc-like casing in such a manner that said individual one of said at least one circuit component which is subject to heating comes close to said internal surface.

17. The motor and pedal driven bicycle according to claim 9, further comprising:

a pedal rotatably supported on a first end of a crank;

a chain sprocket coaxially provided on a crank spindle at a second end of said crank; and a chain ring with teeth mounted on the hub shell and coupled to said chain sprocket through a chain for transmitting a driving force generated by a revolution of said pedal to said hub shell through said crank, said chain sprocket and said chain when desired.

\* \* \* \* \*